(12) United States Patent
Wiggins et al.

(10) Patent No.: US 10,919,547 B2
(45) Date of Patent: Feb. 16, 2021

(54) ENCODER BEARING HUB ASSEMBLY FOR RAIL VEHICLES

(71) Applicant: HARSCO TECHNOLOGIES LLC, Fairmont, MN (US)

(72) Inventors: John Wiggins, West Columbia, SC (US); Eric Carter, West Columbia, SC (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 257 days.

(21) Appl. No.: 15/947,290

(22) Filed: Apr. 6, 2018

(65) Prior Publication Data

US 2018/0290671 A1 Oct. 11, 2018

Related U.S. Application Data

(60) Provisional application No. 62/482,779, filed on Apr. 7, 2017.

(51) Int. Cl.
| | |
|---|---|
| *B61K 9/12* | (2006.01) |
| *F16C 41/00* | (2006.01) |
| *G01P 3/44* | (2006.01) |
| *B61K 9/02* | (2006.01) |

(52) U.S. Cl.
CPC .............. *B61K 9/12* (2013.01); *B61K 9/02* (2013.01); *F16C 41/007* (2013.01); *F16C 41/008* (2013.01); *G01P 3/443* (2013.01); *F16C 2233/00* (2013.01); *F16C 2326/02* (2013.01); *F16C 2326/10* (2013.01)

(58) Field of Classification Search
CPC . B61K 9/12; B61K 9/02; F16C 41/008; F16C 41/007; F16C 2233/00; F16C 2326/10; F16C 2326/02; G01P 3/443
See application file for complete search history.

(56) References Cited

U.S. PATENT DOCUMENTS

| | | |
|---|---|---|
| 2003/0179967 A1 | 9/2003 | Meeker et al. |
| 2004/0237831 A1* | 12/2004 | Tremblay ................ B60B 37/00 105/72 |

(Continued)

FOREIGN PATENT DOCUMENTS

JP 2001359201 A 12/2001

OTHER PUBLICATIONS

International Search Report for PCT/US2018/026481 dated Jul. 19, 2018.

*Primary Examiner* — Daniel S Larkin
*Assistant Examiner* — Anthony W Megna Fuentes
(74) *Attorney, Agent, or Firm* — Norton Rose Fulbright US LLP

(57) ABSTRACT

The present disclosure generally relates to a bearing hub assembly of a rail guide wheel apparatus for a rail vehicle. The bearing hub assembly may couple rail wheels to the rail guide wheel apparatus. The rail guide wheel apparatus may be included on a Hi-Rail vehicle or any other vehicle configured to travel along railroad tracks. The bearing hub assembly includes a sensor that is integrally mounted within the bearing hub assembly. The sensor collects information associated with rotation of the rail wheels. Information collected by the sensor may be used to determine a speed, direction, location, and/or distance traveled of the rail vehicle.

16 Claims, 7 Drawing Sheets

(56) References Cited

U.S. PATENT DOCUMENTS

2010/0019761 A1* 1/2010 Ueno .................. G01P 3/489
                                                              324/207.25
2010/0083686 A1   4/2010 Reels et al.
2013/0047729 A1   2/2013 Wigh et al.
2013/0160669 A1   6/2013 Turmeau et al.

* cited by examiner

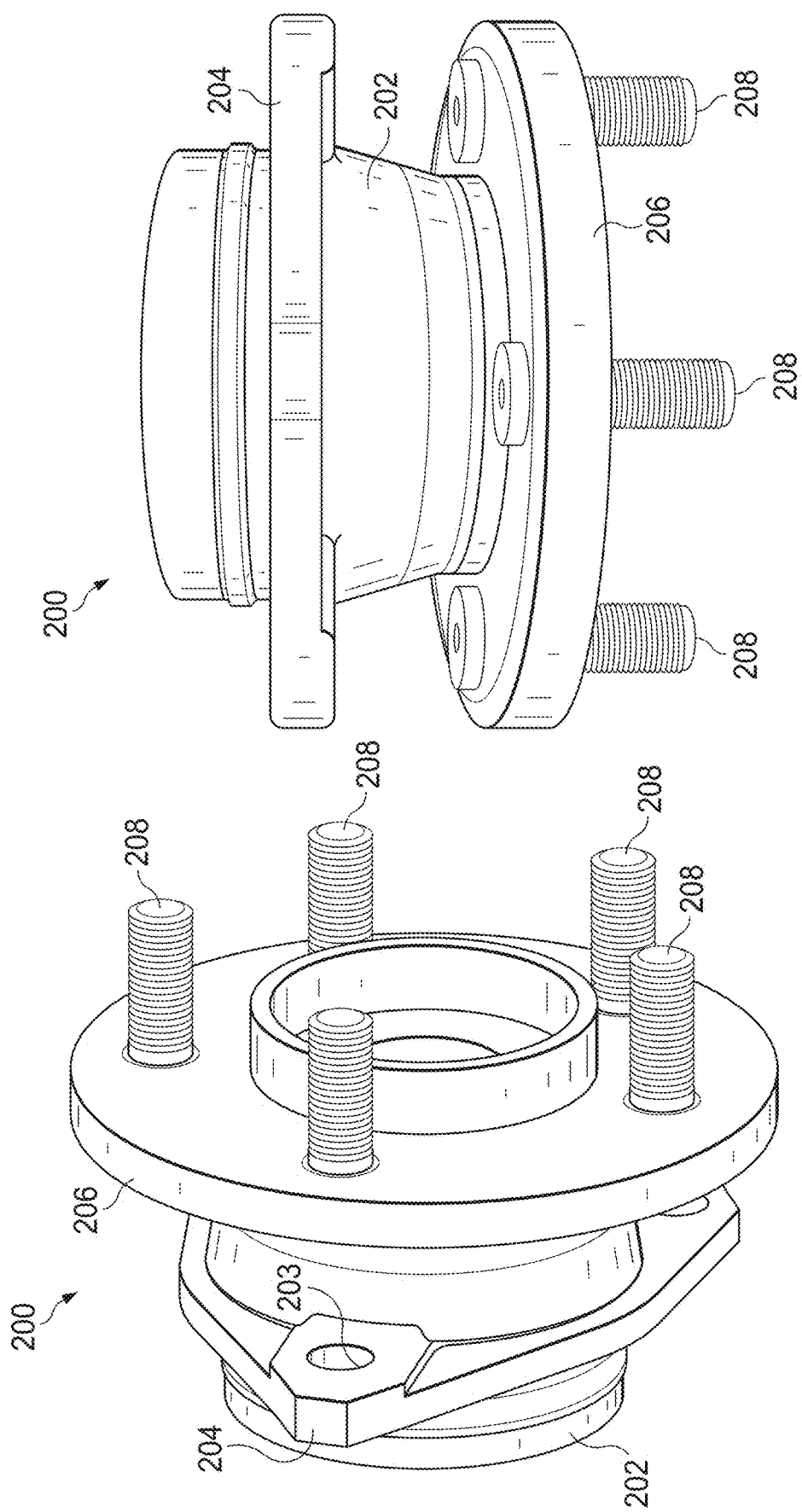

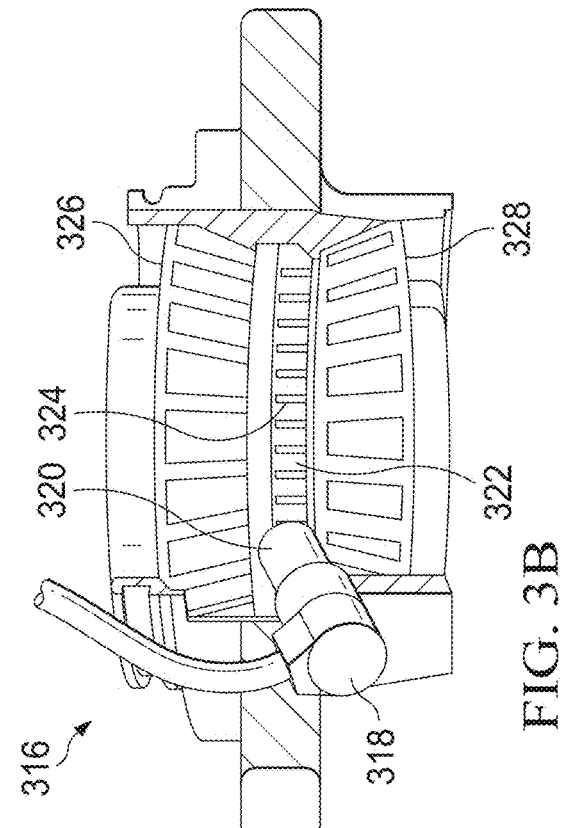
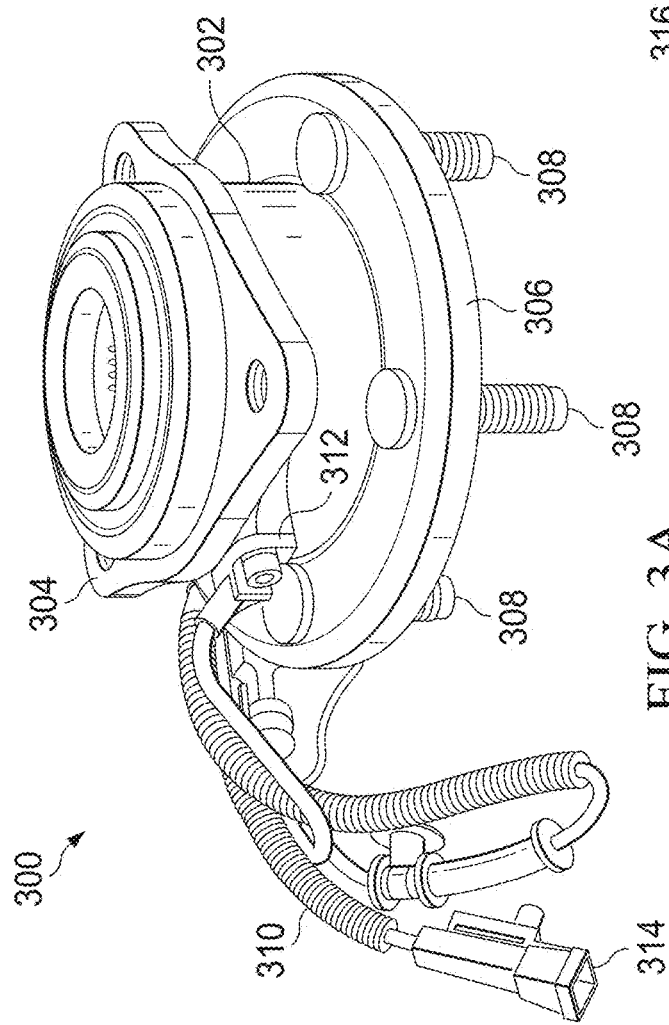
FIG. 3B
FIG. 3A

ENCODER BEARING HUB ASSEMBLY FOR RAIL VEHICLES

CROSS-REFERENCE TO RELATED APPLICATION

This application claims priority to U.S. Provisional Patent Application No. 62/482,779 filed on Apr. 7, 2017, the disclosure of which is hereby incorporated by reference in entirety.

BACKGROUND

Rail vehicles, such as track maintenance vehicles, are often deployed on track to provide information on track features. One such rail vehicle is a Hi-Rail vehicle, which is enabled to operate on both railroad tracks and road surfaces. Hi-Rail vehicles typically include two pairs of axles: (1) a first pair of axles outfitted with rail wheels for interfacing with rails of railroad tracks; and (2) a second pair of axles outfitted with road wheels for use on road surfaces.

Distances traveled by rail vehicles, such as Hi-Rail vehicles on both rail and road surfaces, can be measured. For example, an encoder may be mounted to an outside surface of a rail vehicle's rail wheel. The encoder may then measure a speed, distance, and/or direction of the rail vehicle as it is propelled along rails of a railroad track.

However, the use of encoders in this manner is problematic. First, installing an encoder to an outside surface of a rail wheel is a difficult and labor-intensive process. An encoder mounted to an outside surface of a rail wheel is also highly prone to damage, particularly because the encoder may collide with track features, structures, and/or vegetation as the rail vehicle is propelled along rails of a railroad track. Additionally, externally-mounted encoders are difficult to calibrate and may require frequent adjustment and realignment. As such, improved means for measuring travel of a rail vehicle along a railroad track is desired.

BRIEF SUMMARY

The present disclosure generally relates to a bearing hub assembly for use with rail wheels of a rail vehicle, such as a Hi-Rail vehicle. The bearing hub assembly mounts rail wheels to a rail guide wheel apparatus of the rail vehicle. The bearing hub assembly is mounted to an inside surface of the rail wheels. A sensor integral to the bearing hub assembly measures distance, speed, rotation, and/or direction of the rail wheel as the rail vehicle is propelled along rails of a railroad track. By utilizing a bearing hub assembly that includes an integrated sensor, time required for adjusting and/or aligning the sensor with respect to the rail wheel is drastically reduced. Additionally, utilizing a sensor mounted on an inside surface of a rail wheel as opposed to utilizing an externally-mounted sensor reduces the amount of risk associated with potential collision damages and ultimately increases the longevity of the sensor's operation.

BRIEF DESCRIPTION OF THE DRAWINGS

Reference is now made to the following descriptions taken in conjunction with the accompanying drawings.

FIG. 2A illustrates an exemplary bearing hub assembly according to the present disclosure.

FIG. 2B illustrates a front view of the bearing hub assembly of FIG. 2A.

FIG. 3A illustrates an exemplary bearing hub assembly according to the present disclosure.

FIG. 3B illustrates a cutaway view of the bearing hub assembly of FIG. 3A.

DETAILED DESCRIPTION

Various embodiments of a bearing hub assembly are described according to the present disclosure. It is to be understood, however, that the following explanation is merely exemplary in describing the devices and methods of the present disclosure. Accordingly, several modifications, changes, and substitutions are contemplated.

As described throughout, a railroad track may include a pair of elongated, substantially parallel rails, which may be coupled to a plurality of laterally extending rail ties. In some embodiments, a top surface of each rail tie may be coupled to a bottom surface of the rails. The rail ties may be disposed on a ballast bed of hard particulate material such as gravel (e.g., ballast, rocks, and/or the like) and may be used to support the rails. The railroad track may further include a variety of track features used for securing the rails to rail ties, the ground, and/or other structures. For example, track features such as spikes or anchors may be used to couple a rail to an underlying rail tie. As described herein, a track feature may refer to any type of railroad track hardware such as an anchor, a spike, a rail tie, a tie plate, a tie hole, a rail joint, a switch, a rail hole, and/or the like.

Figure 1A:
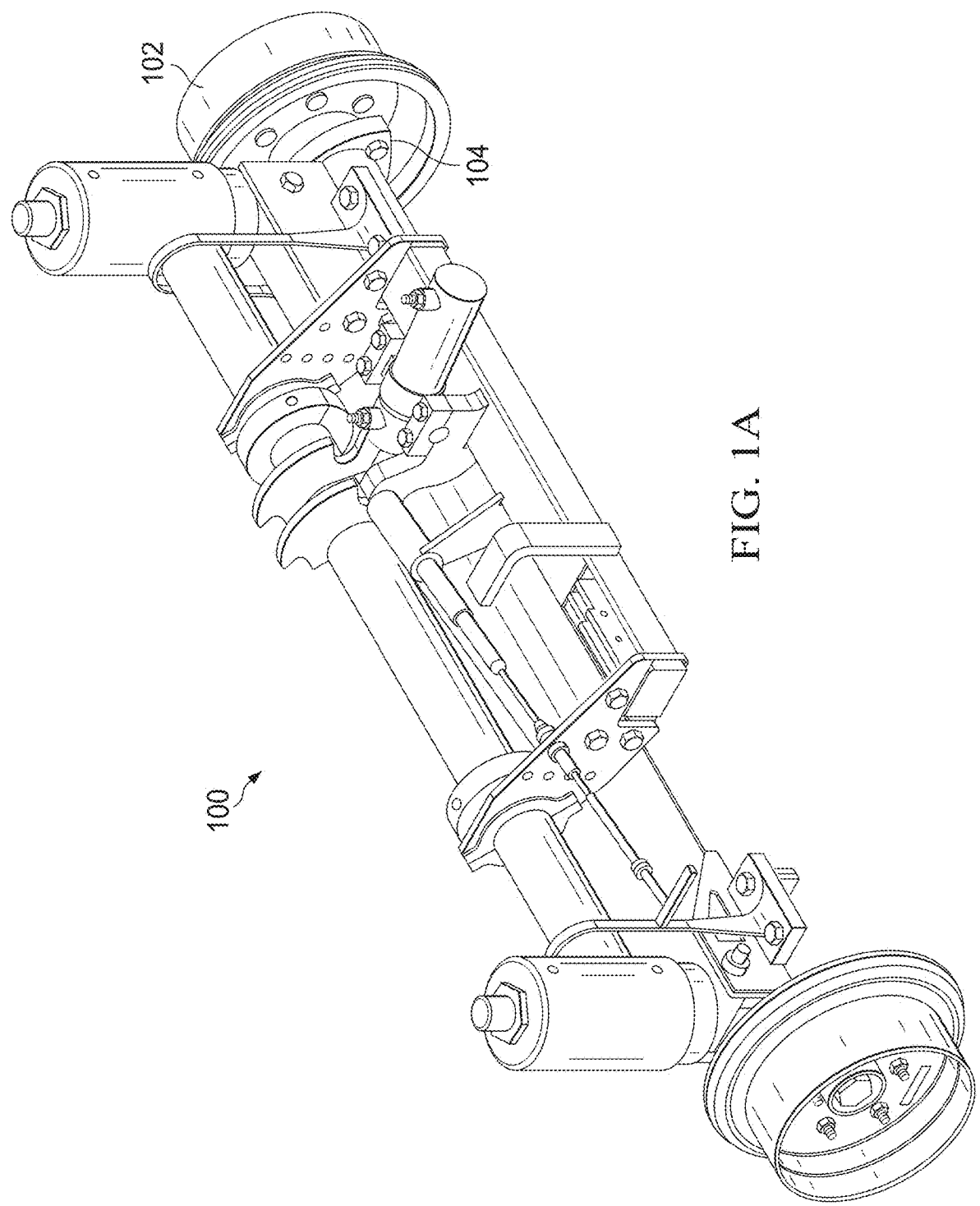
FIG. 1A illustrates an exemplary rail guide wheel apparatus of a rail vehicle according to the present disclosure.
Figure 1B:
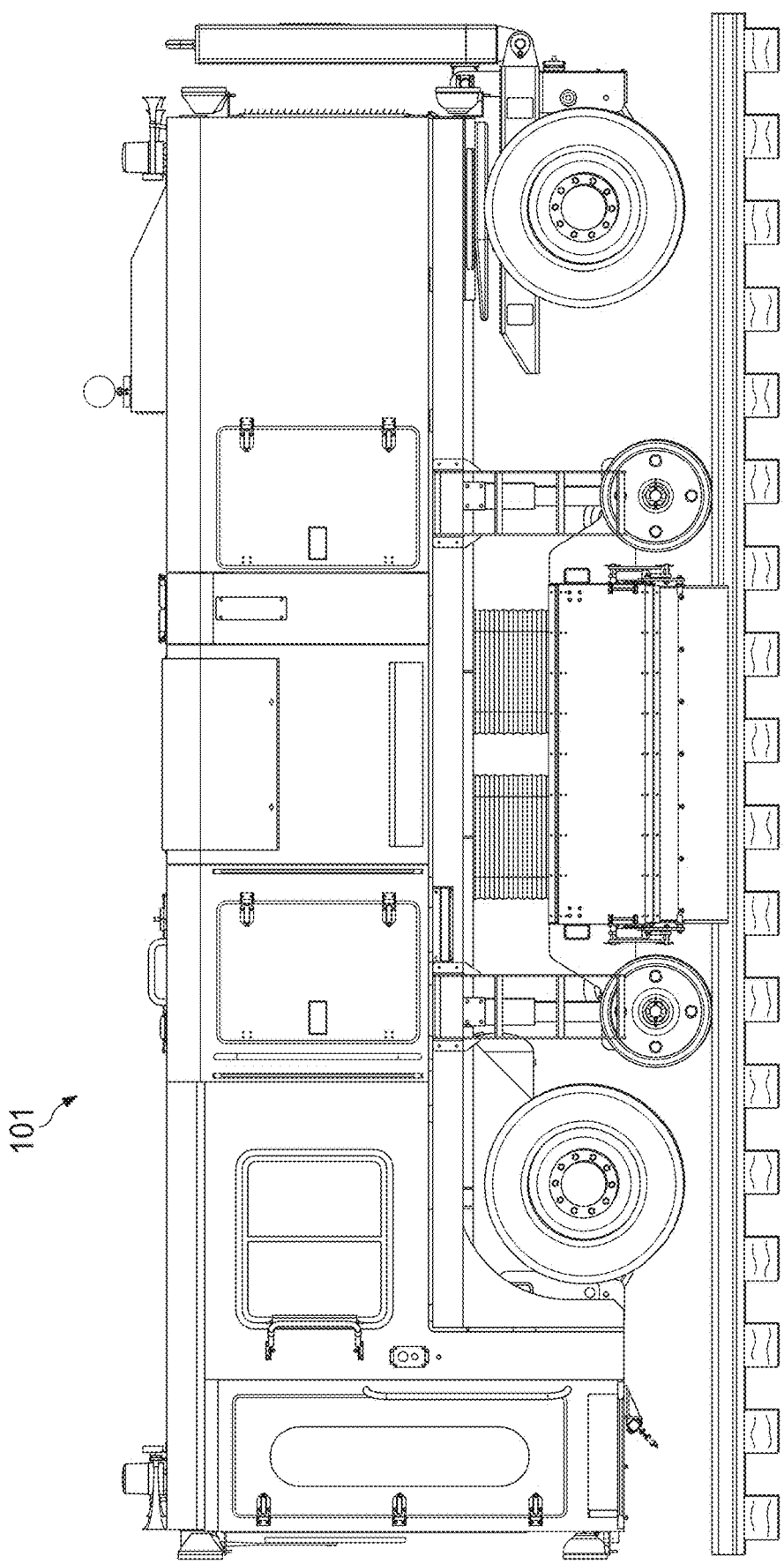
FIG. 1B illustrates an exemplary Hi-Rail vehicle according to the present disclosure.

As shown in FIG. 1A, a rail guide wheel apparatus 100 may be provided. In some embodiments, the rail guide wheel apparatus 100 may be provided with a Hi-Rail vehicle, such as the vehicle 101 shown in FIG. 1B. Vehicle 101 is only exemplary. The rail guide wheel apparatus 100 may be included in any type of rail vehicle configured to be propelled along rails of the underlying railroad track. For example, the rail guide wheel apparatus 100 may be included in a chassis of a Hi-Rail vehicle, a rail maintenance vehicle, a rail passenger vehicle, a manned rail vehicle, an unmanned rail vehicle (e.g., a drone vehicle), and/or any other rail vehicle. In some embodiments, the chassis may be towed behind another rail vehicle as the other rail vehicle propels itself along the rails of the railroad track. Alternatively, the chassis may be self propelled and may thus include an engine, a propulsion system, and/or another operating system for propelling the chassis along the rails of the railroad track.

As shown in FIG. 1A, the rail guide wheel apparatus 100 may include one or more rail wheels 102. Rail wheels 102 of the rail guide wheel apparatus 100 may interface with top and inside surfaces of underlying rails (not pictured) as the chassis is propelled along the railroad tracks. Rail wheels 102 may couple to the rail guide wheel apparatus 100 via a bearing hub assembly 104, which enables smooth and efficient rotation of a rail wheel 102 with respect to the rail guide wheel apparatus 100 and/or associated chassis or vehicle.

FIGS. 2A and 2B illustrate an exemplary bearing hub assembly 200 according to the present disclosure. In some embodiments, the bearing hub assembly 200 may correspond the bearing hub assembly 104 of FIG. 1A. The bearing hub assembly 200 may include a bearing hub assembly used in road vehicles such as an automobile, a car, a sedan, a sport utility vehicle (SUV), a bus, a truck, a van, and/or the like. The bearing hub assembly 200 may be manufactured from a rigid material such as steel, iron, a metal alloy, a composite material, a plastic, carbon fiber, and/or the like.

In some embodiments, the bearing hub assembly 200 may include a body portion 202 that interfaces with an outside surface of a rail guide wheel apparatus (e.g., rail guide wheel apparatus 100 of FIG. 1A). To enable coupling with the rail guide wheel apparatus, the body portion 202 of the bearing hub assembly 200 may include a mounting portion 204. The mounting portion 204 may be integral with and extend laterally outwardly from the body portion 202 and may include one or more apertures 203 through which couplings may be inserted. For example, a coupling (e.g., a screw, a bolt, a pin, and/or the like) extending outwardly from an outside surface of a rail guide wheel apparatus may be inserted and/or received by an aperture 203 of the mounting portion 204. In some embodiments, the mounting portion 204 may include three apertures 203. In other embodiments, the mounting portion 204 may include a different number of apertures such that the number of apertures included in the mounting portion 204 matches the number of corresponding couplings and/or apertures of the rail guide wheel apparatus. The body portion 202 and the mounting portion 204 may be manufactured as one common piece and/or as separate pieces operatively coupled together.

The bearing hub assembly 200 may further include a disc portion 206. The disc portion 206 may be operatively coupled to the body portion 202 of the bearing hub assembly 200. In some embodiments, the disc portion 206 may be rotatably coupled to the body portion 202 so as to enable rotation of the disc portion 206 (and thus a rail wheel coupled to the disc portion 206) relative to the body portion 202 along a common longitudinal axis (e.g., a longitudinal axis of the rail guide wheel apparatus). The bearing hub assembly 200 may include one or more bearings (e.g., ball bearings, magnets, and/or the like) which enable smooth rotation of the rail wheels 102. The body portion 202 and the disc portion 206 may also be manufactured as a common piece and/or separate pieces operatively coupled together.

The disc portion 206 may be operable to receive one or more couplings 208 for interfacing with an inside surface of a rail wheel. In some embodiments, the one or more couplings 208 may include removable and/or stationary screws, bolts, pins, and/or other fasteners. For example, the one or more couplings 208 may be inserted through apertures included in the disc portion 206. Alternatively, the one or more couplings 208 may be integrally formed into the disc portion 206.

The one or more couplings 208 may be inserted through one or more corresponding apertures of a rail wheel. Once the one or more couplings 208 have been inserted through the corresponding apertures of the rail wheel from the inside (e.g., on an inside surface of the rail wheel), fasteners such as nuts, stops, caps, locks, and/or the like may be affixed to the one or more couplings on the outside surface of the rail wheel. In this manner, the rail wheel may be secured to the disc portion 206 and thus the bearing hub assembly 200.

FIG. 3A illustrates an exemplary bearing hub assembly 300 (e.g., the same or similar to the bearing hub assembly 104 of FIG. 1A and/or the bearing hub assembly 200 of FIGS. 2A and 2B). Similar to the bearing hub assembly 200, the bearing hub assembly 300 may include a body portion 302 (e.g., the body portion 202 of FIG. 2), a mounting portion 304 (e.g., the mounting portion 204 of FIG. 2), a disc portion 306 (e.g., disc portion 206 of FIG. 2), and one or more couplings 308 (e.g., the one or more couplings 208 of FIG. 2).

However, the bearing hub assembly 300 may also include a sensor 310 for measuring various pieces of information associated with travel of rail wheels (and thus the associated chassis) along a railroad track. The sensor 310 may include an encoder, an odometer, a magnet and/or magnetic pole, an optical sensor, a camera, a global positioning system (GPS), an anti-lock brake system (ABS) sensor, and/or another element of computing environment 500 described herein with reference to FIG. 5A and/or FIG. 5B. In some embodiments, the sensor 310 may include multiple sensors and may be adapted to receive, collect, and/or store signals of different voltages, amplitudes, and/or types.

A first end 312 of the sensor 310 may operatively couple to the body portion 302 of the bearing hub assembly 300, whereas a second end 314 of the sensor 310 may operatively couple to an electronics connector of the rail guide wheel apparatus of the chassis. One or more couplings may be utilized to couple the first and/or the second ends 312, 314 of the sensor 310. The first end 312 of the sensor 310 may be permanently and/or detachedly coupled to the body portion 302 of the bearing hub assembly 300. Similarly, the second end 314 of the sensor 310 may be permanently and/or detachedly coupled to the electronics connector of the rail guide wheel apparatus.

FIG. 3B illustrates a cutaway view of an exemplary bearing hub assembly 316 (e.g., the bearing hub assembly 104 of FIG. 1, the bearing hub assembly 200 of FIG. 2, and/or the bearing hub assembly 300 of FIG. 3A). The cutaway view shows how a sensor 318 includes a sensor head 320 that may be positioned within the bearing hub assembly 316 so as to collect information associated with operation (e.g., track travel) of a corresponding rail wheel.

For example, the bearing hub assembly 316 may include a ring member 322 having a plurality of magnets 324 disposed around an outside surface of the ring member (e.g., within a bearing chamber of the bearing hub assembly 316). In some embodiments, the ring member 322 is integral with or operatively coupled to the disc portion such that the ring member rotates with the disc portion and thus the rail wheel. The ring member 322 is disposed in between two bearings 326, 328 of the bearing hub assembly 316. Each of the magnets 324 of the ring member 322 may be polarized with a first polarity and may be disposed around the outside surface of the ring member 322 at even distances relative to one another. The sensor head 320 of the sensor 318 may include a magnetic pole of a second polarity that is opposite the first polarity and may be configured to determine when a magnet 324 of the ring member 322 passes in front of the sensor head 320. So, as the rail wheel (and thus the disc portion 306 of the bearing hub assembly 316 to which the rail wheel is coupled) rotates, the sensor head 320 may detect the number of magnets 324 that have passed in front of the location of the sensor head 320 within the bearing hub assembly 316. Because the size of the rail wheel, the number of magnets, and/or the distance between magnets are known and fixed quantities, a speed, a distance, a location, and/or a direction of the rail wheel (and thus travel of the chassis) can be calculated with ease.

In another example, the magnets 324 of the bearing hub assembly 318 may be replaced with visual markers, such as notches, printed and/or otherwise disposed and/or identified on the ring member 322. As the ring member 322 rotates within the bearing chamber of the bearing hub assembly 316, a camera included in the sensor head 320 may identify and count a number of markers and/or marker types. In a similar fashion as the magnetic example above, a speed, a distance, a location, and/or a direction of the rail wheel (and thus travel of the chassis) can be calculated with ease.

Because the sensor head 320 is integral to the bearing hub assembly 316, minimal calibration of the sensor head 320 is required, especially compared to externally-mounted encoders. As a result, the bearing hub assembly 316 described herein may be more easily maintained.

The sensor head 320 collects (e.g., receives, captures, detects, and/or the like) information associated with movement of the rail wheel. As described above, the information collected by the sensor head 320 may include a speed, a direction, a location, and/or a distance of a rail wheel and/or the chassis of an associated rail vehicle. Information collected by the sensor head 320 may also include fluid level information, information associated with a status and/or condition of one or more rail vehicle elements, location information associated with a rail vehicle and/or a track feature, and/or the like.

Once collected, the information may be transmitted as a signal from the sensor 318 to a central data server for storage and/or processing. The collected information may be used for a variety of purposes related to railroad track maintenance, rail vehicle performance, and/or rail vehicle maintenance. For example, maintenance service of rail wheels or rail guide wheel apparatus and/or other elements of a rail vehicle may be identified based on collected track travel information (e.g., based on determining that a rail wheel has rotated a number of times more than a predetermined threshold, based on determining that a rail vehicle has traveled a greater distance than a predetermined threshold, based on determining inspection and maintenance of the rail guide wheel apparatus from actual usage, and/or the like).

Figure 4:
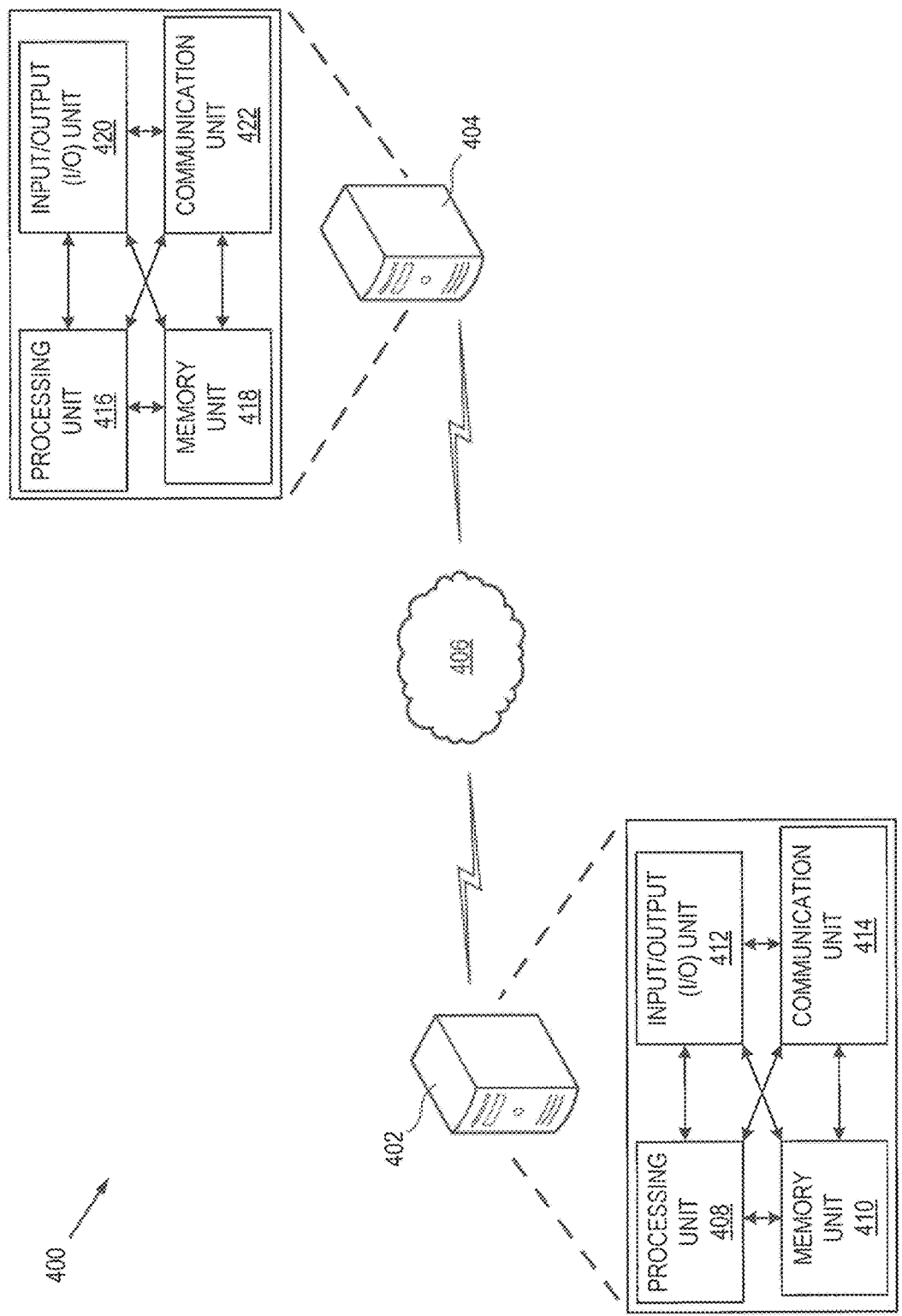
FIG. 4 illustrates an exemplary system according to the present disclosure.

FIG. 4 illustrates a system 400 for enabling operation of the bearing hub assemblies of FIG. 1A, FIGS. 2A and 2B, and/or FIGS. 3A and 3B, as well as other bearing hub assemblies contemplated herein. In some embodiments, the system 400 may include a sensor device 402 of a bearing hub assembly and a data server 404.

The sensor device 402 and the data server 404 may be communicatively coupled to one another by a network 406 as described herein. As such, a variety of data may be transmitted between the sensor device 402 and the data server 404 during operation of the bearing hub assembly. The network 406 may include any wireless and/or wired communications network that facilitates communication between the sensor device 402 and the data server 404, as well as between any other electronic devices (e.g., a user's smartphone, a third party server, and/or the like). For example, the network 406 may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like. In some embodiments, the network 406 may also include a plurality of networks.

The sensor device 402 may be associated with a bearing hub assembly (e.g., the bearing hub assembly 104 of FIG. 1A, the bearing hub assembly 200 of FIGS. 2A and 2B, and/or the bearing hub assemblies 300, 318 of FIGS. 3A and 3B, respectively) of a railroad vehicle chassis and/or a rail wheel axle (e.g., rail wheel axle 102 of FIG. 1A). The sensor device 402 may include a sensor, an encoder, an odometer, a magnet and/or magnetic pole, an optical sensor, a camera, a global positioning system (GPS), an anti-lock brake system (ABS) sensor, a computing device such as a mainframe server, a content server, a communication server, and/or any element of computing environment 500 described herein with reference to FIG. 5A and/or FIG. 5B. The sensor device 402 may also include multiple devices configured to communicate with one another and/or implement operations described herein.

In some embodiments, the sensor device 402 may include a processing unit 408, a memory unit 410, an input/output (I/O) unit 412, and/or a communication unit 414. Each of the processing unit 408, the memory unit 410, the input/output (I/O) unit 412, and/or the communication unit 414 may include one or more subunits and/or other computing instances as described herein.

The data server 404 may be associated with an onboard and/or off-site computing device for processing collected information associated with track travel. For example, the data server 404 may include a cloud-based server that is not onboard the railroad chassis. Alternatively, the data server 404 may be included onboard the railroad chassis and/or the rail wheel axle. In some embodiments, the data server 404 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The data server 404 may also include multiple computing devices configured to communicate with one another and perform operations described herein.

Figure 5A:
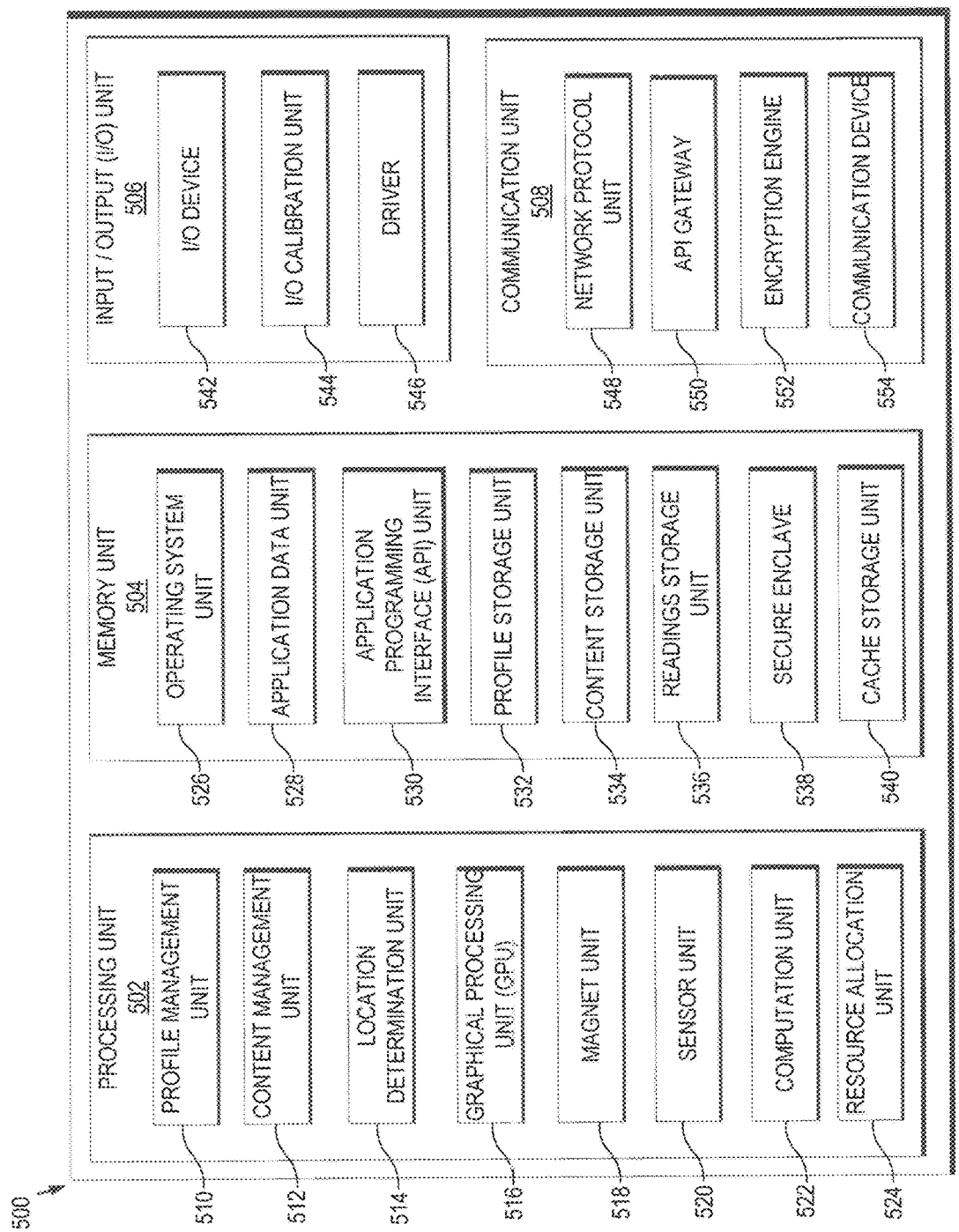
FIG. 5A illustrates an exemplary computing environment according to the present disclosure.
Figure 5B:
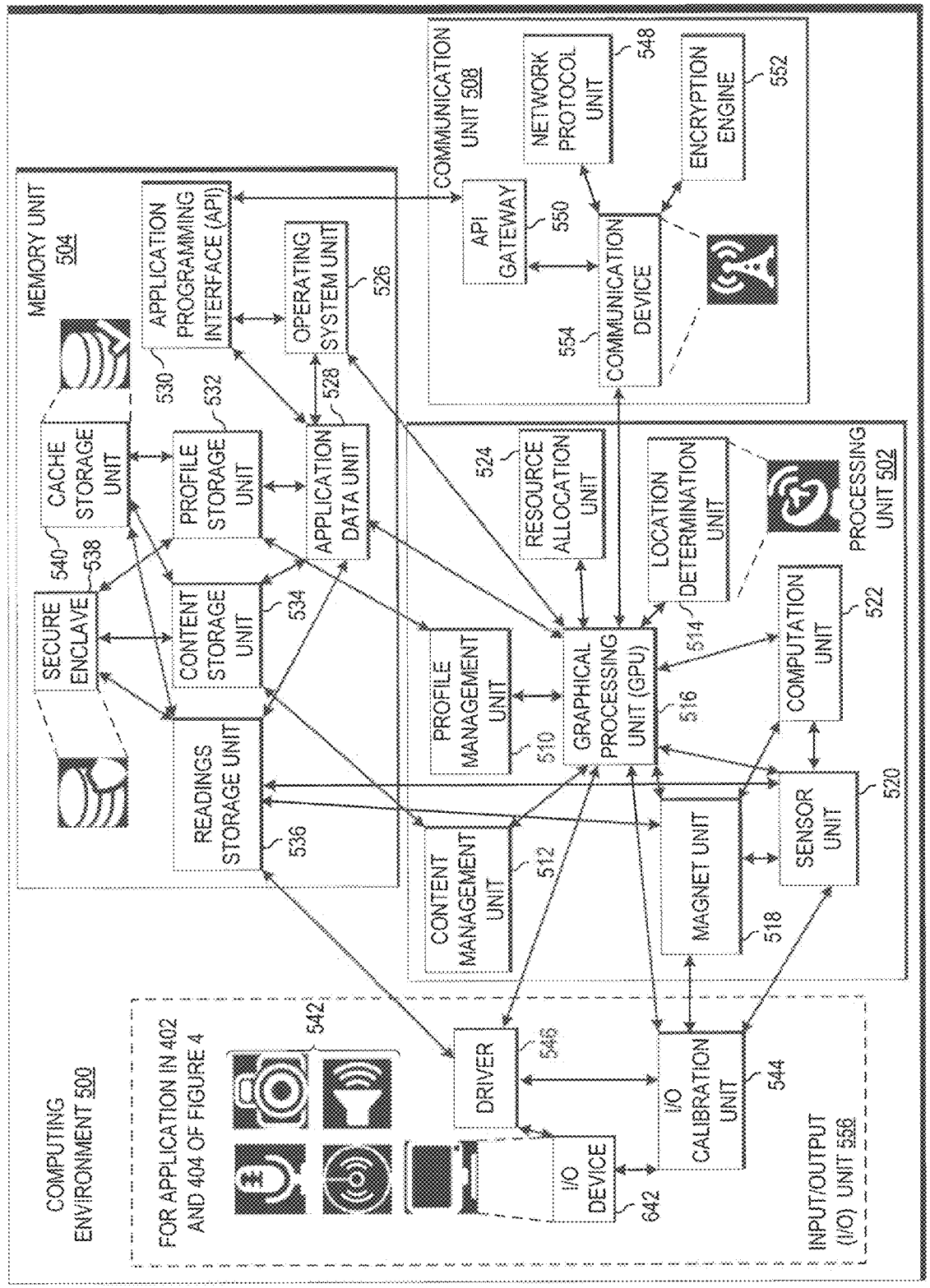
FIG. 5B illustrates an exemplary connectivity diagram of the computing environment of FIG. 5A.

The data server 404 may include various elements of a computing environment as described herein (e.g., computing environment 500 of FIG. 5A and FIG. 5B). For example, the data server 404 may include a processing unit 416, a memory unit 418, an input/output (I/O) unit 420, and/or a communication unit 422. Each of the processing unit 416, the memory unit 418, the input/output (I/O) unit 420, and/or the communication unit 422 may include one or more subunits and/or other computing instances for performing operations described herein.

FIG. 5A and FIG. 5B illustrate exemplary functional and system diagrams of a computing environment 500 for enabling operations described herein. Specifically, FIG. 5A provides a functional block diagram of the computing environment 500, whereas FIG. 5B provides a detailed system diagram of the computing environment 500. Additionally, any units and/or subunits described herein with reference to the computing environment 500 of FIG. 5A and/or FIG. 5B may be included in one or more elements of FIG. 4, such as the sensor device 402 and/or the data server 404. The computing environment 500 and/or any of its units and/or subunits described herein may include general hardware, specifically-purposed hardware, and/or software.

The computing environment 500 may include, among other elements, a processing unit 502, a memory unit 504, an input/output (I/O) unit 506, and/or a communication unit 508. As described herein, each of the processing unit 502, the memory unit 504, the I/O unit 506, and/or the communication unit 508 may include and/or refer to a plurality of respective units, subunits, and/or elements. Furthermore, each of the processing unit 502, the memory unit 504, the I/O unit 506, and/or the communication unit 508 may be operatively and/or otherwise communicatively coupled with each other so as to facilitate performance of the operations described herein. Further, the processing unit 502, the memory unit 504, the I/O unit 506, and/or the communication unit 508 may refer to the processing unit 408, the memory unit 410, the I/O unit 412, and/or the communication unit 414 of the sensor device 402 of FIG. 4. Additionally, the processing unit 502, the memory unit 504, the I/O unit 506, and/or the communication unit 508 may refer to the processing unit 416, the memory unit 418, the I/O unit 420, and/or the communication unit 422 of the data server 402 of FIG. 4.

The processing unit 502 may control any of the one or more units 504, 506, 508, as well as any included subunits, elements, components, devices, and/or functions performed by the units 504, 506, 508 included in the computing environment 500. The described sub-elements of the computing environment 500 may also be included in similar fashion in any of the other units and/or devices included in the system 400 of FIG. 4. Additionally, any actions described herein as being performed by a processor may be taken by the processing unit 502 alone and/or by the processing unit in conjunction with one or more additional processors, units, subunits, elements, components, devices, and/or the like. Additionally, while only one processing unit 502 may be shown in FIG. 5A and/or FIG. 5B, multiple processing units may be present and/or otherwise included in the computing environment 500 or elsewhere in the overall system (e.g., system 400 of FIG. 4). Thus, while instructions may be described as being executed by the processing unit 502 (and/or various subunits of the processing unit 502), the instructions may be executed simultaneously, serially, and/or otherwise by one or multiple processing units.

In some embodiments, the processing unit 502 may be implemented as one or more computer processing unit (CPU) chips and/or graphical processing unit (GPU) chips and may include a hardware device capable of executing computer instructions. The processing unit 502 may execute instructions, codes, computer programs, and/or scripts. The instructions, codes, computer programs, and/or scripts may be received from and/or stored in the memory unit 504, the I/O unit 506, the communication unit 508, subunits and/or elements of the aforementioned units, other devices and/or computing environments, and/or the like.

In some embodiments, the processing unit 502 may include, among other elements, subunits such as a profile management unit 510, a content management unit 512, a location determination unit 514, a graphical processing unit (GPU) 516, a magnet unit 518, a sensor unit 520, a computation unit 522, and/or a resource allocation unit 524. Each of the aforementioned subunits of the processing unit 502 may be communicatively and/or otherwise operably coupled with each other.

The profile management unit 510 may facilitate generation, modification, analysis, transmission, and/or presentation of a profile associated with a rail vehicle (e.g., a Hi-Rail vehicle). For example, the profile management unit 510 may operate a database for managing information associated with the rail vehicle as described herein. The profile management unit 510 may receive, process, analyze, organize, and/or otherwise transform any data received from the user and/or another computing element so as to generate a profile of the rail vehicle that includes a manufacture name, a model name, a size, a weight, dimensions, a load, maintenance information, and/or location information of the same.

The content management unit 512 may facilitate generation, modification, analysis, transmission, and/or presentation of user interfaces for enabling operation of bearing hub assemblies described herein. For example, the content management unit 512 may control the audio-visual environment and/or appearance of application data during execution of various processes. Media content for which the content management unit 512 may be responsible may include advertisements, images, text, themes, audio files, video files, documents, and/or the like. In some embodiments, the content management unit 512 may also interface with a third-party content server and/or memory location.

The location determination unit 514 may facilitate detection, generation, modification, analysis, transmission, and/or presentation of location information associated with the rail vehicle. Location information may include global positioning system (GPS) coordinates, a mile marker, an Internet protocol (IP) address, a media access control (MAC) address, geolocation information, an address, a port number, a zip code, a server number, a proxy name and/or number, device information (e.g., a serial number), and/or the like. In some embodiments, the location determination unit 514 may include various sensors, a radar, and/or other specifically-purposed hardware elements for enabling the location determination unit 514 to acquire, measure, and/or otherwise transform location information.

The GPU unit 516 may facilitate generation, modification, analysis, processing, transmission, and/or presentation of images, video content, sensor data, and/or any other information during operations described herein. In some embodiments, the GPU unit 516 may be utilized to render visual content for presentation on a user device, analyze collected sensor data, and/or the like. The GPU unit 516 may also include multiple GPUs and therefore may be configured to perform and/or execute multiple processes in parallel.

The magnet unit 518 may facilitate the capture of sensor data associated with magnets included in the bearing hub assemblies described herein. For example, the magnet unit 518 may be utilized for counting a number of magnets that have passed in front of a sensor head as described herein. In some embodiments, the magnet unit 518 may include GPUs and/or other processing elements so as to enable efficient analysis of images in either series or parallel.

The sensor unit 520 may facilitate the transformation and/or transmission of sensor data captured by the sensors described herein. For example, the sensor unit 520 may be used to power a sensor during operation and transmit collected sensor data from a sensor head and to a data server.

The computation unit 522 may facilitate the monitoring, analysis, and/or processing of collected sensor data. For example, the computation unit 522 may count a number of magnets that have passed in front of a sensor head as described herein. The computation unit 522 may also determine a location, distance, speed, and/or direction of the rail vehicle based on processing collected sensor data. The computation unit 522 may also generate reports and/or recommendations for a maintenance service (e.g., a repair and/or inspection) of the rail vehicle and/or an element of the rail vehicle based on processing collected sensor data.

The resource allocation unit 524 may facilitate the determination, monitoring, analysis, and/or allocation of computing resources throughout the system described herein. For example, the system may facilitate a high volume of (e.g., multiple) communication connections between a large number of sensors of multiple rail vehicles and/or associated processing servers (e.g., the sensor device 402 and/or the data server 404 of FIG. 4). As such, computing resources of the computing environment 500 (and/or any subunit of the aforementioned units) such as processing power, data storage space, network bandwidth, and/or the like may be in high demand at various times during operation. Accordingly, the resource allocation unit 524 may be configured to manage the allocation of various computing resources as they are required by particular units and/or subunits of the computing environment 500 and/or other computing environments. In some embodiments, the resource allocation unit 524 may include sensors and/or other specially-purposed hardware for monitoring performance of each unit and/or subunit of the computing environment 500, as well as hardware for responding to the computing resource needs of each unit and/or subunit. In some embodiments, the resource allocation unit 524 may utilize computing resources of a second computing environment separate and distinct from the computing environment 500 to facilitate a desired operation.

For example, the resource allocation unit 524 may determine a number of simultaneous communication connections and/or incoming requests for sensor data and/or sensor data processing. The resource allocation unit 524 may then determine that the number of simultaneous communication connections and/or incoming requests for meets and/or exceeds a predetermined threshold value. Based on this determination, the resource allocation unit 524 may determine an amount of additional computing resources (e.g., processing power, storage space of a particular non-transitory computer-readable memory medium, network bandwidth, and/or the like) required by the processing unit 502, the memory unit 504, the I/O unit 506, the communication unit 508, and/or any subunit of the aforementioned units for enabling safe and efficient operation of the computing environment 500 while supporting the number of simultaneous communication connections and/or incoming requests. The resource allocation unit 524 may then retrieve, transmit, control, allocate, and/or otherwise distribute determined amount(s) of computing resources to each element (e.g., unit and/or subunit) of the computing environment 500 and/or another computing environment.

In some embodiments, factors affecting the allocation of computing resources by the resource allocation unit 524 may include the number of ongoing communication connections and/or other communication channel connections, a number of image analysis and/or reporting processes, a duration of time during which computing resources are required by one or more elements of the computing environment 500, and/or the like. In some embodiments, computing resources may be allocated to and/or distributed amongst a plurality of second computing environments included in the computing environment 500 based on one or more factors mentioned above. In some embodiments, the allocation of computing resources of the resource allocation unit 524 may include the resource allocation unit 524 flipping a switch, adjusting processing power, adjusting memory size, partitioning a memory element, transmitting data, controlling one or more input and/or output devices, modifying various communication protocols, and/or the like. In some embodiments, the resource allocation unit 524 may facilitate utilization of parallel processing techniques.

In some embodiments, the memory unit 504 may be utilized for storing, recalling, receiving, transmitting, and/or accessing various files and/or information during operation of the computing environment 500. For example, the memory unit 504 may be utilized for storing collected sensor data, rail vehicle profile information, and/or the like. The memory unit 504 may include various types of data storage media such as solid state storage media, hard disk storage media, and/or the like. The memory unit 504 may include dedicated hardware elements such as hard drives and/or servers, as well as software elements such as cloud-based storage drives. For example, the memory unit 504 may include various subunits such as an operating system unit 526, an application data unit 528, an application programming interface (API) unit 530, a profile storage unit 532, a content storage unit 534, a readings storage unit 536, a secure enclave 538, and/or a cache storage unit 540.

The memory unit 504 and/or any of its subunits described herein may include random access memory (RAM), read only memory (ROM), and/or various forms of secondary storage. RAM may be used to store volatile data and/or to store instructions that may be executed by the processing unit 502. For example, the data stored may be a command, a current operating state of the computing environment 500, an intended operating state of the computing environment 500, and/or the like. As a further example, data stored in the memory unit 504 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 504 may include one or more databases for storing any data described herein. Additionally or alternatively, one or more secondary databases located remotely from the computing environment 500 may be utilized and/or accessed by the memory unit 504.

The operating system unit 526 may facilitate deployment, storage, access, execution, and/or utilization of an operating system utilized by the computing environment 500 and/or any other computing environment described herein. In some embodiments, the operating system may include various hardware and/or software elements that serve as a structural framework for enabling the processing unit 502 to execute various operations described herein. The operating system unit 526 may further store various pieces of information and/or data associated with operation of the operating system and/or the computing environment 500 as a whole, such as a status of computing resources (e.g., processing power, memory availability, resource utilization, and/or the like), runtime information, modules to direct execution of operations described herein, and/or the like.

The application data unit 528 may facilitate deployment, storage, access, execution, and/or utilization of an application utilized by the computing environment 500 and/or any other computing environment described herein (e.g., the sensor device 402 and/or the data server 404 of FIG. 4). For example, users may be required to download, access, and/or otherwise utilize a software application on a computing device in order for various operations described herein to be performed. As such, the application data unit 528 may store any information and/or data associated with the application. Information included in the application data unit 528 may enable a user and/or computer processor to execute various operations described herein. The application data unit 528 may further store various pieces of information and/or data associated with operation of the application and/or the computing environment 500 as a whole, such as a status of computing resources (e.g., processing power, memory availability, resource utilization, and/or the like), runtime information, modules to direct execution of operations described herein, and/or the like.

The API unit 530 may facilitate deployment, storage, access, execution, and/or utilization of information associated with APIs of the computing environment 500 and/or any other computing environment described herein. For example, the computing environment 500 may include one or more APIs for enabling various devices, applications, and/or computing environments to communicate with each other and/or utilize the same data (e.g., sensor data). Accordingly, the API unit 530 may include API databases containing information that may be accessed and/or utilized by applications and/or operating systems of other devices and/or computing environments. In some embodiments, each API database may be associated with a customized physical circuit included in the memory unit 504 and/or the API unit 530. Additionally, each API database may be public and/or private, and so authentication credentials may be required to access information in an API database.

The profile storage unit 532 may facilitate deployment, storage, access, and/or utilization of information associated with profiles of rail vehicles. For example, the profile storage unit 532 may store identification information, location information, dimensions, usage information, and/or metadata associated with a rail vehicle. In some embodiments, the profile storage unit 532 may communicate with the profile management unit 510 to receive and/or transmit information associated with a profile.

The content storage unit 534 may facilitate deployment, storage, access, and/or utilization of information associated with requested content by the computing environment 500 and/or any other computing environment described herein. For example, the content storage unit 534 may store one or more user interfaces, application information, and/or metadata to be presented to a user and/or otherwise utilized during operations described herein. In some embodiments, the content storage unit 534 may communicate with the content management unit 512 to receive and/or transmit content files.

The readings storage unit 536 may facilitate deployment, storage, access, analysis, and/or utilization of collected sensor data. For example, the readings storage unit 536 may store information associated with a number of magnet passes at a bearing hub assembly of a rail vehicle. The readings storage unit 536 may also store generated maintenance requests and/or reports. In some embodiments, the readings storage unit 536 may communicate with the GPUs 316, the magnets unit 518, the sensor unit 520, and/or the computation unit 522 to facilitate analysis of any collected sensor data.

The secure enclave 538 may facilitate secure storage of data. In some embodiments, the secure enclave 538 may include a partitioned portion of storage media included in the memory unit 504 that is protected by various security measures. For example, the secure enclave 538 may be hardware secured. In other embodiments, the secure enclave 538 may include one or more firewalls, encryption mechanisms, and/or other security-based protocols. Authentication credentials of a user may be required prior to providing the user access to data stored within the secure enclave 538.

The cache storage unit 540 may facilitate short-term deployment, storage, access, analysis, and/or utilization of data. In some embodiments, the cache storage unit 540 may serve as a short-term storage location for data so that the data stored in the cache storage unit 540 may be accessed quickly. In some embodiments, the cache storage unit 540 may include RAM and/or other storage media types that enable quick recall of stored data. The cache storage unit 540 may included a partitioned portion of storage media included in the memory unit 504.

The I/O unit 506 may include hardware and/or software elements for enabling the computing environment 500 to receive, transmit, and/or present information. For example, elements of the I/O unit 506 may be used to capture sensor data associated with a rail vehicle. In this manner, the I/O unit 506 may enable the computing environment 500 to interface with a rail vehicle as well as a human user. As described herein, the I/O unit 506 may include subunits such as an I/O device 542, an I/O calibration unit 544, and/or driver 546.

The I/O device 542 may facilitate the receipt, transmission, processing, presentation, display, input, and/or output of information as a result of executed processes described herein. In some embodiments, the I/O device 542 may include a plurality of I/O devices. For example, the I/O device 542 may include a variety of elements that enable capturing of sensor data such as a sensor, an encoder, an odometer, a magnet and/or magnetic pole, an optical sensor, a camera, a global positioning system (GPS), an anti-lock brake system (ABS) sensor, and/or the like. The I/O device 542 may also include hardware for interfacing with a user, such as a keyboard, a touchscreen, a button, a sensor, a biometric scanner, a laser, a microphone, a camera, and/or another element for receiving and/or collecting input from a user. Additionally and/or alternatively, the I/O device 542 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 542 may communicate with one or more elements of the processing unit 502 and/or the memory unit 504 to execute operations described herein.

The I/O calibration unit 544 may facilitate the calibration of the I/O device 542. For example, the I/O calibration unit 544 may detect and/or determine one or more settings of the I/O device 542, and then adjust and/or modify settings so that the I/O device 542 may operate more efficiently.

In some embodiments, the I/O calibration unit 544 may utilize a driver 546 (or multiple drivers) to calibrate the I/O device 542. For example, a driver 546 may be installed on a computer that enables a sensor of a bearing hub assembly to capture sensor data in a particular manner. In some embodiments, the I/O device 542 may be calibrated by the I/O calibration unit 544 by based on information included in the driver 546.

The communication unit 508 may facilitate establishment, maintenance, monitoring, and/or termination of communications (e.g., a communication connection) between computing devices of the system described herein. The communication unit 508 may further enable communication between various elements (e.g., units and/or subunits) of the computing environment 500. In some embodiments, the communication unit 508 may include a network protocol unit 548, an API gateway 550, an encryption engine 552, and/or a communication device 554. The communication unit 508 may include hardware and/or software elements.

The network protocol unit 548 may facilitate establishment, maintenance, and/or termination of a communication connection between computing environment 500 and another computing environment (e.g., the sensor device 402 and the data server 404 of FIG. 4) by way of a network. For example, the network protocol unit 548 may detect and/or define a communication protocol required by a particular network and/or network type. Communication protocols utilized by the network protocol unit 548 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication between the computing environment 500 and any other device, as well as any element internal to the computing environment 500, may include transforming and/or translating data from being compatible with a first communication protocol to being compatible with a second communication protocol. In some embodiments, the network protocol unit 548 may determine and/or monitor an amount of data traffic to consequently determine which particular network protocol is to be used for establishing a video communication connection, transmitting data, and/or performing other operations described herein.

The API gateway 550 may facilitate the enablement of other devices and/or computing environments to access the API unit 530 of the memory unit 504 of the computing environment 500. For example, a user device may access the API unit 530 via the API gateway 550. In some embodiments, the API gateway 550 may be required to validate user credentials associated with a user of a user device prior to providing access to the API unit 530 to the user. The API gateway 550 may include instructions for enabling the computing environment 500 to communicate and share information with another device.

The encryption engine 552 may facilitate translation, encryption, encoding, decryption, and/or decoding of information received, transmitted, and/or stored by the computing environment 500. Using the encryption engine, each transmission of data may be encrypted, encoded, and/or translated for security reasons, and any received data may be encrypted, encoded, and/or translated prior to its processing and/or storage. In some embodiments, the encryption engine 552 may generate an encryption key, an encoding key, a translation key, and/or the like, which may be transmitted along with any data content.

The communication device 554 may include a variety of hardware and/or software specifically purposed to enable communication between the computing environment 500 and another device, as well as communication between elements of the computing environment 500. In some embodiments, the communication device 554 may include one or more radio transceivers, chips, analog front end (AFE) units, antennas, processing units, memory, other logic, and/or other components to implement communication protocols (wired or wireless) and related functionality for facilitating communication between the computing environment 500 and any other device. Additionally and/or alternatively, the communication device 554 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

What is claimed is:

1. A bearing hub assembly for a rail vehicle comprising:
a body portion configured to couple to an outside surface of a rail guide wheel apparatus;
a disc portion operatively coupled to the body portion and configured to couple to an inside surface of a rail wheel, wherein the disc portion is configured to rotate with the rail wheel and relative to the body portion;
a ring member including a plurality of magnets each having a first polarity, the ring member configured to rotate with the disc portion; and
a sensor disposed on the body portion, wherein the sensor is configured to capture sensor data associated with rotation of the disc portion and the sensor includes a sensor head having a second polarity opposite to the first polarity and aligned with the ring member such that the sensor head is configured to detect movement of the plurality of magnets.

2. The bearing hub assembly of claim 1, further comprising a mounting portion extending laterally outward from the body portion, the mounting portion configured to receive couplings to couple the body portion to the rail guide wheel apparatus.

3. The bearing hub assembly of claim 1, wherein:
the body portion defines at least a portion of a chamber;
one or more bearings are disposed within the chamber; and
the sensor comprises a sensor head disposed within the chamber.

4. The bearing hub assembly of claim 3, wherein the ring member is disposed within the chamber.

5. The bearing hub assembly of claim 3, wherein the one or more bearings comprise:
a first bearing positioned on a first side of the ring member; and
a second bearing positioned on a second side of the ring member.

6. The rail vehicle of claim 1, wherein the sensor head is configured to determine when a magnet of the plurality of magnets passes in front of the sensor head.

7. A rail vehicle, comprising:
a chassis;
a rail guide wheel apparatus coupled to the chassis;
a pair of rail wheels rotatably coupled to the rail guide wheel apparatus, the pair of rail wheels configured to operate over a rail track; and
a bearing hub assembly coupled to the rail guide wheel apparatus, the bearing hub assembly comprising:
a body portion coupled to an outside surface of the rail guide wheel apparatus;

a disc portion operatively coupled to the body portion and coupled to an inside surface of a first rail wheel of the pair of rail wheels, wherein the disc portion is configured to rotate with the first rail wheel and relative to the body portion;

a plurality of magnets each having a first polarity; and a sensor disposed on the body portion;

wherein:

the sensor is configured to capture sensor data associated with rotation of the disc portion; and the sensor has a second polarity opposite to the first polarity, the sensor being configured to detect passage of a magnet of the plurality of magnets.

8. The rail vehicle of claim 7, wherein the rail vehicle is a track maintenance vehicle.

9. The rail vehicle of claim 8, wherein the track maintenance vehicle is a Hi-Rail vehicle.

10. The rail vehicle of claim 7, wherein:

the rail guide wheel apparatus comprises a rail axle; and the bearing hub assembly is interposed between the first rail wheel and the rail axle.

11. The rail vehicle of claim 10, wherein the bearing hub assembly further comprises a mounting portion extending laterally outward from the body portion, the mounting portion configured to receive couplings to couple the bearing hub assembly to the rail guide wheel apparatus.

12. The rail vehicle of claim 11, wherein the mounting portion is integral with the body portion.

13. The rail vehicle of claim 11, wherein the mounting portion defines a plurality of apertures configured to be inserted into the couplings of the rail guide wheel apparatus.

14. The rail vehicle of claim 7, wherein the sensor comprises:

a first end coupled to the body portion; and a second end configured to couple to an electronic device.

15. The rail vehicle of claim 7, wherein:

the body portion defines at least a portion of a chamber; and further comprising a ring member disposed within the chamber, the ring member configured to rotate with the disc portion.

16. The rail vehicle of claim 15, wherein the plurality of magnets are coupled to the ring member.

\* \* \* \* \*